April 21, 1942.　　　M. MALLORY　　　2,280,712
INTERNAL COMBUSTION ENGINE
Filed Sept. 20, 1940
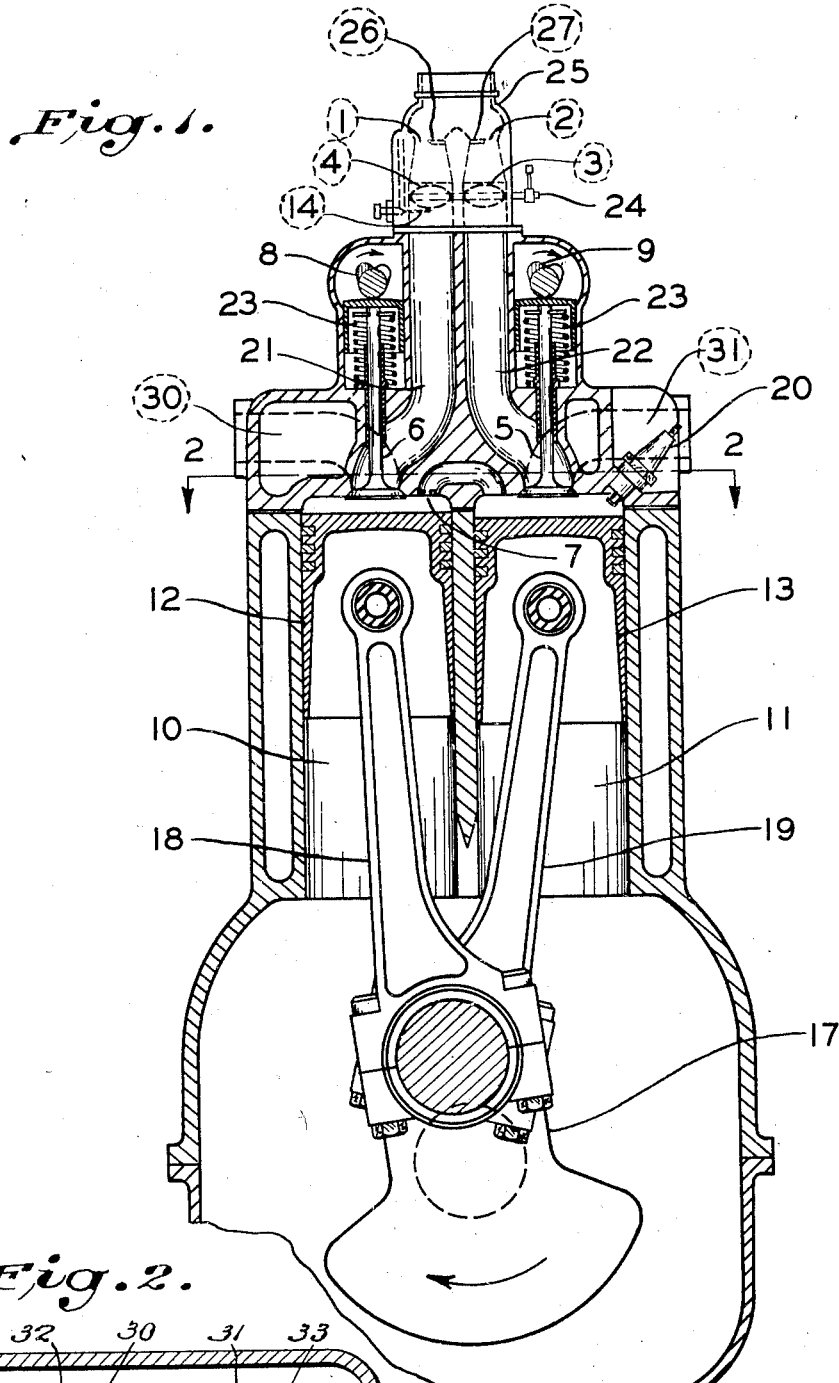
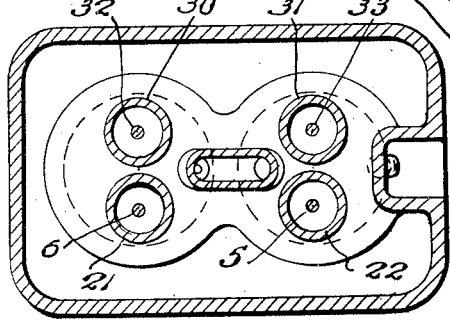
INVENTOR.
MARION MALLORY
BY Barnes, Kisselle, Laughlin & Raisch
ATTORNEYS.

Patented Apr. 21, 1942

2,280,712

UNITED STATES PATENT OFFICE 2,280,712

INTERNAL COMBUSTION ENGINE

Marion Mallory, Detroit, Mich.

Application September 20, 1940, Serial No. 357,531

10 Claims. (Cl. 123—53)

This invention relates to an internal combustion engine. The invention relates more particularly to an internal combustion engine in which each power unit comprises a pair of pistons operating in a pair of cylinders which are in continuous communication with each other. Each cylinder is provided with an intake valve and an exhaust valve for charging and exhausting, whereby each cylinder is charged and exhausted independently of each other. One of the pistons leads the other a few degrees. The combustion chambers or cylinders are connected together by a highly restricted passage and used for the sole purpose of regulating the compressions between the two cylinders and igniting the charge in the cylinder by flame from the cylinder which is electrically ignited, and not merely to make a common combustion chamber of the two cylinders.

As well-known, the so-called double cylinder engines having a common combustion chamber, where one piston leads the other, do have leverage advantages, due to the fact that a maximum compression is maintained when one of the pistons has passed center. However, this advantage has been offset in these types of engines heretofore used because proper ignition timing could not be obtained. For example; it is necessary to ignite the charge in an engine a considerable time before the piston reaches top dead center, and if the leverage advantage is to be utilized in the double cylinder engine having a common combustion chamber, the spark or ignition must take place before the piston reaches dead center, and it makes no difference in which cylinder the spark plug is located. Proper ignition timing could not be had; that is, if the advantage of leverage were used in this type of engine.

If the spark plug were located in the leading cylinder and the spark was timed to occur at the proper time before the piston in this cylinder reached top center, the ignition timing would be too early in the cylinder that had the lagging piston, and, if the spark plug were located in the cylinder that has the lagging piston and the ignition timed to take place at a proper time before it reached dead center, the explosion would be too late in the leading piston. Therefore, the ignition timing would be too late or too early in one of the cylinders regardless of how the ignition was timed, and due to this, the gain in leverage in these types of engines is lost.

Of course, the spark could be timed to occur when both pistons were at the same distance from top dead center, which would be the proper timing. When this is done, however, the advantage of leverage in the two cylinder common combustion chamber engines, where one piston leads the other, cannot be had. In other words, if the spark is timed so that it occurs when both pistons are at the same distance from top dead center, the engine has no advantage over the ordinary single cylinder engine.

I propose to use electric ignition in the lagging cylinder, timed properly to get the best results, and a flame from the explosion of the cylinder having the lagging piston for igniting the charge in the cylinder having the leading piston. Of course, the cylinder having the leading piston will be fired at a time when it is closer to center than the cylinder having the lagging piston. In fact, the cylinder having the leading piston is so close to center that efficiency could not be had if it were ignited by an electric spark. However, if ignited by a flame, the late timing or late ignition has the same effect as if it were ignited earlier by an electric spark. This is due to the highly restricted passage from one cylinder to the other, and the higher this restriction, the more rapid will be the combustion in the cylinder having the lagging piston. Therefore, when a flame is used, the cylinder having the lagging piston can be ignited late without any loss in power.

Due to the fact that the passage of a high restriction is essential, it is necessary to charge and scavenge the two cylinders independently of each other. In other words, the restriction between the two cylinders cannot be large enough to scavenge one cylinder or to charge one cylinder. If it were, the effect of flame ignition and regulating the compression between the two cylinders, which is essential, would be impossible.

In the drawing:

Fig. 1 shows a vertical section through the engine which is the subject matter of this invention.

Fig. 2 is a section along the line 2—2 or Fig. 1.

The cylinders 10 and 11, for purposes of description rather than by way of limitation, are of the same size. The upper ends of the cylinders above the pistons are in continuous communication by means of a port or passageway 7. The cylinders 10 and 11 are provided with the usual pistons 12 and 13 which are connected to a common crankshaft 17 by connecting rods 18 and 19 respectively. The pistons are arranged so that on the compression stroke piston 12 slightly leads piston 13. However, since the pistons 12 and 13 are connected to a common crank of the crankshaft 17 they have strokes of equal lengths.

The head of cylinder 11 is provided with an electric spark plug 20 for igniting the fuel and air mixture in the combustion chamber of cylinder 11.

Cylinders 10 and 11 are provided with intake manifold passageways 21 and 22 respectively of identical sizes. Manifold passageway 21 communicates with cylinder 10 through an intake port controlled by intake valve 6 and manifold passageway 22 communicates with cylinder 11 by an intake port controlled by intake valve 5. The two intake valves 6 and 5 are opened in unison by cams 8 and 9 respectively and closed in unison by the usual compression springs 23. Manifold passageway 21 is controlled by butterfly throttle valve 4 and manifold passageway 22 is controlled by butterfly throttle valve 3. Throttle valves 3 and 4 are fixed to a common shaft 24 and opened and closed in unison.

The engine is provided with a duplex carburetor, generally designated 25, which is connected with a source of liquid fuel (not shown) in the customary manner. The carburetor is provided with venturis 1 and 2 which communicate respectively with manifold passageways 21 and 22. Cylinders 10 and 11 are provided with conventional exhaust passageways 30 and 31 controlled by conventional exhaust valves 32 and 33. The exhaust valves are opened and closed in the well known manner from the same cam shaft that operates the intake valves 5 and 6.

The carburetor venturis 1 and 2 are provided with fuel nozzles or jets 26 and 27 respectively. The carburetor is also provided with an idle bypass 14. When the engine is working under no load or idling, an idling fuel mixture is admitted to cylinder 10 only and nothing but air is admitted to the cylinder 11.

The two cylinders 10 and 11 represent one power unit corresponding to the single cylinder of the conventional engine. In other words, if the engine had four pairs of cylinders 10 and 11 (eight cylinders total) the intervals at which the explosions would occur would be the same as in a conventional four cylinder engine.

Piston 13 is arranged so that it lags about nine degrees behind piston 12. In the conventional engine fired by a spark plug, the firing usually occurs a few degrees before center. Where a firing pocket is used, the combustion takes place a great deal faster which makes firing by a firing pocket the equivalent of firing about ten degrees earlier with a spark plug or electric ignition. Thus to obtain an efficiency and power output heretofore not obtainable, it is proposed to fire cylinder 11 by means of spark plug 20 in the conventional manner, say, for example, about ten degrees before piston 13 reaches dead center.

On the intake stroke of the piston, a fuel air mixture charge will be drawn into cylinder 11 and cylinder 10 through passageways 22 and 21 respectively, and since piston 12 leads piston 13 on the compression stroke, the compression in cylinder 11 over piston 13 will lag behind the compression in cylinder 10 over piston 12. Naturally, part of the charge in cylinder 10 will be forced through restriction 7 into cylinder 11 during the compression stroke of piston 12. Because of this cylinder 11 contains its own charge drawn through passageway 22, and in addition, part of the charge from cylinder 10, and, since the restriction 7 is small, the additional charge will not have time enough to escape back into cylinder 10. Naturally, the compression will be higher in cylinder 11 than in cylinder 10 when the electric ignition takes place. Although the compression is high, detonation will not take place because a part of the rapid rise in pressure is relieved by the flaming mixture escaping through restriction 7. At the time of firing piston 12 is on dead center. Piston 13 only has about ten degrees more of compression stroke. Piston 13 cannot force the additional fuel-air mixture back into cylinder 10 in the remaining ten degrees of compression stroke with the result that at the time of firing the compression in cylinder 11 is higher than that in cylinder 10. Thus, at the time of firing, about ten degrees before center, cylinder 11 acts as a firing pocket and acts through passage 7 to ignite the fuel-air charge in cylinder 10 which is equivalent to igniting the charge in cylinder 10 about ten degrees before center for spark plug or electric ignition.

Although cylinder 11 acts as a firing pocket it has a tremendous advantage over the conventional firing pocket in that it does not bottle the power or energy created by the combustion of the fuel mixture. As cylinder 11 fires, the pressure in this cylinder rises considerably and this acts through passage 7 to raise the pressure in cylinder 10 as it too is fired. This also acts to increase the efficiency of the engine. After the power stroke is completed, the pistons enter the exhaust stroke and force the burned gases out through the exhaust passageways 30, 31 in the conventional manner and the cycle of the engine is then repeated.

I claim:

1. An internal combustion engine comprising two cylinders, a piston for each of said cylinders, one of said pistons leading the other, an exhaust port and an intake port for each cylinder, valves for controlling said ports, a restricted passage between the two cylinders which is open continuously and serves primarily for venting compressed fuel mixture out of the cylinder having the leading piston into the cylinder having the lagging piston during the compression stroke of the leading piston and to vent burning gases from the cylinder having the lagging piston back into the cylinder having the leading piston to ignite the fuel charge in the cylinder having the leading piston, means for supplying a fuel mixture to said cylinders through said intake ports on the intake strokes of the pistons, the fuel mixture charge for each cylinder entering the cylinder through its respective intake port and the exhaust gases of each cylinder being exhausted through its respective exhaust port, and electric ignition means for firing the fuel mixture in the cylinder having the lagging piston before it reaches dead center and about the time the leading piston reaches dead center whereby the cylinder with the lagging piston acts as a firing pocket and fires the fuel mixture in the other cylinder through the said passage.

2. An internal combustion engine comprising two cylinders, a piston for each of said cylinders, one of said pistons leading the other approximately ten degrees, an exhaust port and an intake port for each cylinder, valves for controlling said ports, a restricted passage between the two cylinders which is open continuously and serves primarily for venting compressed fuel mixture out of the cylinder having the leading piston into the cylinder having the lagging piston during the compression stroke of the leading piston and to vent burning gases from the cylinder having the lagging piston back into the cylinder having the leading piston to ignite the fuel charge in the cylinder having the leading piston, means for supplying a fuel mixture to said cylinders through said intake ports on the intake strokes of the pistons, the fuel mixture charge for each cylinder entering the cylinder through its respective intake port and the exhaust gases of each cylinder being exhausted through its respective exhaust port, and electric ignition means for firing the fuel mixture in the cylinder having the lagging piston about ten degrees before it reaches dead center whereby the cylinder with the lagging piston acts as a firing pocket and fires the fuel mixture in the other cylinder through the said passage.

3. An internal combustion engine comprising two cylinders, an exhaust port and an intake port for each cylinder, valves for controlling said ports, a piston for each of said cylinders, a crank shaft, connecting rods for connecting the pistons to the crankshaft so that the one piston leads the other, the said pistons cooperating with the cylinders to form independent combustion chambers, a continuously open restricted passage between the two combustion chambers which serves primarily for venting compressed fuel mixture out of the cylinder having the leading piston into the cylinder having the lagging piston during the compression stroke of the leading piston and to vent burning gases from the cylinder having the lagging piston back into the cylinder having the leading piston to ignite the fuel charge in the cylinder having the leading piston, a carburetor for supplying a fuel mixture to the said combustion chambers through said intake ports on the intake strokes of the pistons, and electric ignition means for firing the fuel mixture in the combustion chamber of the cylinder having the lagging piston before it reaches dead center and about the time the leading piston reaches dead center whereby the combustion chamber of the cylinder with the lagging piston acts as a firing pocket and fires the fuel mixture in the other combustion chamber through the said passage.

4. An internal combustion engine comprising two cylinders, an exhaust port and an intake port for each cylinder, valves for controlling said ports, a piston for each of said cylinders, a crank shaft, connecting rods for connecting the pistons to the crankshaft so that the one piston leads the other approximately ten degrees, the said pistons cooperating with the cylinders to form independent combustion chambers, a continuously open restricted passage between the two combustion chambers which serves primarily for venting compressed fuel mixture out of the cylinder having the leading piston into the cylinder having the lagging piston during the compression stroke of the leading piston and to vent burning gases from the cylinder having the lagging piston back into the cylinder having the leading piston to ignite the fuel charge in the cylinder having the leading piston, a carburetor for supplying a fuel mixture through said intake ports to the said combustion chambers on the intake strokes of the pistons, and electric ignition means for firing the fuel mixture in the combustion chamber of the cylinder having the lagging piston about ten degrees before it reaches dead center and about the time the leading piston reaches dead center whereby the combustion chamber of the cylinder with the lagging piston acts as a firing pocket and fires the fuel mixture in the other combustion chamber through the said passage.

5. In an internal combustion engine comprising two cylinders, a piston for each of said cylinders, a crankshaft, connecting rods for connecting the pistons to the crankshaft so that one piston leads the other, an intake and an exhaust port for each cylinder, an intake valve and an exhaust valve for said ports, the fuel mixture charge for each cylinder entering the cylinder through its respective intake port and the exhaust gases of each cylinder being exhausted through its respective exhaust port, a highly restricted passage between the two cylinders which serves primarily for venting compressed fuel mixture out of the cylinder having the leading piston into the cylinder having the lagging piston during the compression stroke of the leading piston and to vent burning gases from the cylinder having the lagging piston back into the cylinder having the leading piston to ignite the fuel charge in the cylinder having the leading piston, a spark plug in the cylinder that has the lagging piston, whereby the mixture in the cylinder that has the lagging piston will be ignited before that piston reaches dead center by an electric spark, and the mixture in the cylinder that has the leading piston will be ignited by a flame from the combustion through the highly restricted passage at a time when the leading piston is closer to top center than the lagging piston.

6. An internal combustion engine comprising two cylinders, a piston for each of said cylinders, a crank shaft, connecting rods for connecting the pistons to the crankshaft so that the one piston leads the other, the said pistons cooperating with the cylinders to form independent combustion chambers, a continuously open restricted passage between the two combustion chambers which serves primarily for venting compressed fuel mixture out of the cylinder having the leading piston into the cylinder having the lagging piston during the compression stroke of the leading piston and to vent burning gases from the cylinder having the lagging piston back into the cylinder having the leading piston to ignite the fuel charge in the cylinder having the leading piston, the said combustion chambers having independent intake ports and independent exhaust ports, valves controlling said ports, means for supplying a fuel mixture to the said combustion chambers through said independent intake ports on the intake strokes of the pistons, the said leading piston on the compression stroke forcing some of the fuel mixture from the cylinder having the leading piston through said restricted passage into the cylinder having the lagging piston whereby at the time of firing the compression in the cylinder having the lagging piston is higher than the compression in the other cylinder, and electric ignition means for firing the fuel mixture in the combustion chamber of the cylinder having the lagging piston before it reaches dead center and about the time the leading piston reaches dead center whereby the combustion chamber of the cylinder with the lagging piston acts as a firing pocket and fires the fuel mixture in the other combustion chamber through the said restricted passage.

7. In an internal combustion engine comprising two cylinders of substantially the same size, a piston for each of said cylinders, an exhaust port for each cylinder, an intake port for each cylinder, the fuel mixture charge for each cylinder entering the cylinder through its respective intake port, valves for controlling said ports, a crankshaft, connecting rods for connecting the pistons to the crankshaft so that one piston leads the other, a restricted passage between the two cylinders, said passage being sufficiently restricted to serve primarily to create a high velocity in the ignition flame passing through the passage from the cylinder having the lagging piston to the other cylinder, the said restricted passage restricting the flow of exhaust gases from one cylinder to the other whereby the exhaust gases of said cylinders are maintained separated and substantially all the exhaust gases of the one cylinder are exhausted through the exhaust port of that cylinder and substantially all the exhaust gases of the other cylinder are exhausted through the exhaust port of that cylinder, and ignition means in the cylinder that has the lagging piston for igniting the mixture in the cylinder that has the lagging piston a few degrees before that piston reaches top dead center whereby the mixture in the cylinder that has the leading piston will be ignited by a flame from the combustion through the restricted passage at a time when the leading piston is closer to top center than the lagging piston.

8. In an internal combustion engine comprising two cylinders of substantially the same size, a piston for each of said cylinders, an exhaust port for each cylinder, an intake port for each cylinder, the fuel mixture charge for each cylinder entering the cylinder through its respective intake port, valves for controlling said ports, a crankshaft, connecting rods for connecting pistons to the crankshaft so that one piston leads the other, a small restricted passage between the two cylinders to serve primarily for venting the compresed fuel charge out of the cylinder having the leading piston into the cylinder having the lagging piston during the compression stroke of the leading piston and to vent the burning gases from the cylinder having the lagging piston back into the cylinder having the leading piston.

9. In an internal combustion engine comprising two cylinders of substantially the same size, a piston for each of said cylinders, an exhaust port for each cylinder, an intake port for each cylinder, the fuel mixture charge for each cylinder entering the cylinder through its respective intake port, valves for controlling said ports, a crankshaft, connecting rods for connecting pistons to the crankshaft so that one piston leads the other, electric ignition means in the cylinder having the lagging piston for igniting the fuel mixture in this cylinder a few degrees before the piston in the lagging piston reaches top dead center, a small restricted passage between the two cylinders to serve primarily for venting the compressed fuel charge out of the cylinder having the leading piston into the cylinder having the lagging piston during the compression stroke of the leading piston and to vent the burning gases from the cylinder having the lagging piston back into the cylinder having the leading piston.

10. In an internal combustion engine comprising two cylinders, a piston for each of said cylinders, the one piston leading the other piston, each cylinder having a valve controlled intake port and a valve controlled exhaust port for charging and exhausting said cylinders, the said pistons on their compression stroke having such a small clearance in the combustion chamber so as to raise the compression high enough to cause detonation, and means for eliminating the detonation in the form of a continuously open restricted passage between the two combustion chambers which serves primarily for venting compressed fuel mixture out of the cylinder having the leading piston when the latter piston is near its dead center position into the cylinder having the lagging piston and subsequently venting the burning mixture from the cylinder having the lagging piston as said lagging piston approaches dead center into the cylinder having the leading piston.

MARION MALLORY.